US012065343B2

(12) United States Patent
Pappi et al.

(10) Patent No.: US 12,065,343 B2
(45) Date of Patent: Aug. 20, 2024

(54) INDUSTRIAL TRUCK WITH REAR AXLE LOAD SENSOR

(71) Applicant: Toyota Material Handling Manufacturing Italy S.p.A., Bologna (IT)

(72) Inventors: Nicola Pappi, Bologna (IT); Andrea Bonsignori, Bologna (IT)

(73) Assignee: Toyota Material Handling Manufacturing Italy S.p.A., Bologna (IT)

( * ) Notice: Subject to any disclaimer, the term of this patent is extended or adjusted under 35 U.S.C. 154(b) by 513 days.

(21) Appl. No.: 17/364,474

(22) Filed: Jun. 30, 2021

(65) Prior Publication Data

US 2022/0002126 A1 Jan. 6, 2022

(30) Foreign Application Priority Data

Jul. 2, 2020 (IT) ........................ 102020000016027

(51) Int. Cl.
*B66F 9/08* (2006.01)
*B66F 9/07* (2006.01)
(Continued)

(52) U.S. Cl.
CPC ................ *B66F 9/082* (2013.01); *B66F 9/07* (2013.01); *B66F 9/075* (2013.01);
(Continued)

(58) Field of Classification Search
CPC ........ B66F 9/082; B66F 9/08; B66F 9/07572; B66F 9/0755; B66F 9/07504; B66F 9/075;
(Continued)

(56) References Cited

U.S. PATENT DOCUMENTS 7,165,643 B2 1/2007 Bozem et al.

FOREIGN PATENT DOCUMENTS

CN 107840289 A * 3/2018 ............ B66F 17/003
EP 2276689 B1 12/2016
(Continued)

OTHER PUBLICATIONS

Italian Search Report, mailed Mar. 4, 2021, for Italian Application No. 202000016027, 8 pages.

*Primary Examiner* — Keith J Frisby
(74) *Attorney, Agent, or Firm* — Seed IP Law Group LLP

(57) ABSTRACT

An industrial truck includes: a chassis, a mast pivotally mounted on the chassis, a lifting element for lifting a load, the lifting element being mounted on the mast in a slidable manner along the mast; a plurality of actuating units including: a lifting actuator configured to move the lifting element along the mast, a tilting actuator configured to tilt the mast with respect to the chassis, a wheel drive system for driving wheels of the industrial truck; a plurality of sensors including: a load sensor for detecting the load on the lifting element, a tilt angle sensor for detecting the tilt angle of the mast with respect to the chassis, and a height sensor for detecting the height of the lifting element with respect to the mast, a control unit configured to control the plurality of actuating units based on information detected by the plurality of sensors for achieving stability of the industrial truck during operation, wherein the control unit is configured to generate one or more control values by using a mathematical model of the industrial truck to which information detected by the plurality of sensors are inputted, the control unit being configured to control the plurality of actuating units based on the one or more control values. The industrial truck further comprises a rear axle load sensor configured to detect the load on a rear axle of the industrial truck, wherein the control unit is configured to control the operation of the
(Continued)

industrial truck also based on a rear axle load value detected by the rear axle load sensor.

11 Claims, 6 Drawing Sheets

(51) Int. Cl.
*B66F 9/075* (2006.01)
*B66F 9/20* (2006.01)
*B66F 17/00* (2006.01)

(52) U.S. Cl.
CPC ........ *B66F 9/07504* (2013.01); *B66F 9/0755* (2013.01); *B66F 9/07572* (2013.01); *B66F 9/20* (2013.01); *B66F 9/205* (2013.01); *B66F 17/003* (2013.01)

(58) Field of Classification Search
CPC ...... B66F 9/07; B66F 9/06; B66F 9/20; B66F 9/205; B66F 9/22; B66F 9/24; B66F 17/003; B66F 17/00
USPC .............. 180/209, 290, 118; 701/50, 36, 45; 414/636, 699, 701, 631, 632, 639, 640, 414/641, 642; 187/223
See application file for complete search history.

(56) References Cited

FOREIGN PATENT DOCUMENTS

| | | | |
|---|---|---|---|
| EP | 3620424 | A1 | 3/2020 |
| WO | 2006/008586 | A1 | 1/2006 |
| WO | 2017/078518 | A1 | 5/2017 |

* cited by examiner

INDUSTRIAL TRUCK WITH REAR AXLE LOAD SENSOR

BACKGROUND

Technical Field

The field of the present invention concerns an industrial truck, such as a forklift truck, with a rear axle load sensor for achieving an improved stability control.

Description of the Related Art

Forklift trucks including a chassis, a mast pivotally mounted on the chassis and a fork slidably mounted on the mast are known in the art. The fork is used to lift a load, for example for transporting ware in a store. The mast can be tilted with respect to the chassis to facilitate loading and unloading of the ware.

During operation of the forklift truck, a stability problem may arise due to a load carried by the truck and an improper command imparted by the user of the truck. For example, in case of heavy load carried by the fork in a lifted position with the mast tilted forward, the center of gravity of the system jointly composed by the truck and the load may be located beyond the front axle of the truck, thus possibly causing a forward tipping of the truck. Also lateral tipping is possible, in case of abrupt steering commanded by the user which causes a lateral acceleration bringing the truck in an unstable condition. Tipping forward may also be caused by a braking operation which causes a too high longitudinal deceleration, thereby bringing the center of gravity of the loaded truck outside the stability triangle, e.g., beyond the front axle of the truck.

In view of the problem of achieving truck stability, control systems have been conceived to avoid that commands by the user may bring the truck in an unstable condition, both at standstill (when truck is in static condition, i.e., is not travelling) and in dynamic state (i.e., when the truck is travelling). For example, known control systems may block the lifting operation of the fork in order to avoid forward tipping under certain circumstances detected by means of a plurality of truck sensors.

The known stability control systems, however, failed to safely prevent loss of stability under any possible condition of operation of the truck at standstill and in dynamic condition. For example, in case one or more of the sensors of the truck is not working properly, the stability control system might fail and allow the truck to be operated in an unsafe condition without providing any alert to the operator. Accordingly, the known stability control systems failed to achieve a stability control in a reliable manner over time, as they were not in the condition to safely detect system improper operation. Furthermore, the known stability control systems failed to achieve stability while maximizing the performance of the truck, for example due to excessive restrictions of the truck operation which do not accurately reflect the actual minimum requirements for achieving stability.

BRIEF SUMMARY

In view of the above objects, the present invention proposes an industrial truck including:

- a chassis,
- a mast pivotally mounted on the chassis,
- a lifting element for lifting a load, the lifting element being mounted on the mast in a slidable manner along the mast,
- a plurality of actuating units including:
  - a lifting actuator configured to move the lifting element along the mast,
  - a tilting actuator configured to tilt the mast with respect to the chassis,
  - a wheel drive system for driving wheels of the industrial truck,
- a plurality of sensors including:
  - a load sensor for detecting the load on the lifting element,
  - a tilt angle sensor for detecting the tilt angle of the mast with respect to the chassis, and
  - a height sensor for detecting the height of the lifting element with respect to the mast,
- a control unit configured to control the plurality of actuating units based on information detected by the plurality of sensors for achieving stability of the industrial truck during operation, wherein the control unit is configured to generate one or more control values by using a mathematical model of the industrial truck to which information detected by the plurality of sensors are inputted, the control unit being configured to control the plurality of actuating units based on the one or more control values,
- wherein the industrial truck further comprises a rear axle load sensor configured to detect the load on a rear axle of the industrial truck, wherein the control unit is configured to control the operation of the industrial truck also based on a rear axle load value detected by the rear axle load sensor.

Accordingly, the industrial truck achieves a proper and reliable stability control by employing the measure of the load on the rear axle of the truck.

Preferably, the control unit is configured to perform a control function check procedure comprising:

- calculating an estimated value of the load on the rear axle by using the mathematical model,
- comparing the estimated value with the rear axle load value detected by the rear axle load sensor, and
- generating an alarm signal when the difference between the estimated value and the detected rear axle load value exceeds a predetermined threshold.

Accordingly, by performing the control function check procedure, the control unit can timely detect a defect in the operation of the stability control (e.g., due to a failure of a sensor) and, thereby, emit a warning to the user. This permits to avoid dangerous situations in which the user might rely on the proper function of the stability control, while the stability control cannot guarantee a proper operation.

Preferably, the control unit is configured to initiate the control function check procedure when the following two conditions are simultaneously verified:

- the control unit determines that the mast is not moving based on signals from the tilt angle sensor and the height sensor and
- the speed sensor detects that the truck is not moving.

Accordingly, the control function check procedure is properly triggered under suitable conditions to verify the correct operation of the stability control. In fact, when the truck is not moving (i.e., the truck is at standstill, or is not translating) and the mast is not moving, the static operation of the truck can be properly monitored, by avoiding the influence of abnormal values which might be detected by the truck sensors, e.g., while the truck drives into a bump and/or a hole in a loaded condition. This permits to properly check reliability of the stability control and its mathematical model under static conditions.

Preferably, the control unit is configured not to initiate a control function check procedure or to dismiss an ongoing control function check procedure when at least one of the following two conditions are verified:

- the control unit determines that the mast is moving based on signals from the tilt angle sensor and the height sensor and
- the sensor speed detects that the industrial truck is moving.

Accordingly, the invention allows to avoid false alarms relating to a failure of the control system, due, e.g., to abnormal values detected by the truck sensors while the loaded truck drives into a bump and/or a hole.

Preferably, the control unit is configured to estimate the longitudinal position of the load on the lifting element based on the load value detected by the load sensor for detecting the load on the lifting element and the rear axle load value detected by the rear axle sensor. The estimated longitudinal position of the load on the lifting element may correspond to the estimated distance between the center of gravity of the load and a reference point of the industrial truck measured in a longitudinal direction of the industrial truck, i.e., a direction from a rear axle to a front axle of the industrial truck; the reference point of the industrial truck may be, e.g., the point of a bearing surface of the lifting element that is closest to the frame of the industrial truck. By estimating the longitudinal position of the load on the fork (which can vary depending on how the user lifted the load or depending on an uneven load weight distribution), it is possible to refine the mathematical model used by the control unit for calculating more accurate control values (such as the maximum allowed lifting height, the maximum allowed forward tilt angle and the maximum allowed backward tilt angle) to be used in the stability control. Thus, the truck may operate with the maximum possible performance while achieving safe and stable operation, as, e.g., the maximum values of lifting height and tilt angles correctly reflect the actual maximum ranges of operation of the truck.

Preferably, the control unit is configured to generate the one or more control values by inputting the estimated longitudinal position of the load to the mathematical model. This permits to enhance the performance of the truck by maximizing the operational ranges of the truck while maintaining safety and stability simultaneously.

Preferably, the control unit is configured to generate an alarm signal when the estimated longitudinal position indicates a position of the load that is not on the lifting element. The condition "the estimated longitudinal position indicates a position of the load that is not on the lifting element" is intended to mean that the estimated longitudinal position exceeds a threshold under which the center of gravity of the load is positioned on the lifting element. The threshold may correspond substantially to the length of the bearing surface of the lifting element in the longitudinal direction of the industrial truck. Accordingly, the control systems can further improve reliability by adequately monitoring the correct functioning of the rear axle load sensor in an efficient manner.

Preferably, the control unit is configured to estimate the longitudinal position of the load on the lifting element when the load value detected by the load sensor increases from zero to a positive value. This permits to timely trigger the estimation of the longitudinal position of the load on the forklift every time a load is lifted, thus ensuring that the mathematical model underlying the stability control is always fed with accurate data. Thus, the stability control accuracy and reliability are further enhanced.

Preferably, the plurality of sensors further includes a truck speed sensor, a truck steering angle sensor, a lateral acceleration sensor and a longitudinal acceleration sensor. This permits to deliver a proper stability control also under dynamic conditions (i.e., the truck is translating), Preferably, the plurality of sensors further includes an inclination sensor configured to detect an inclination of the industrial truck with respect to a horizontal plane. This permits to deliver a proper stability control also in case the truck is on an inclined surface, such as a ramp.

BRIEF DESCRIPTION OF THE SEVERAL VIEWS OF THE DRAWINGS

The above and other advantages of the present invention will be illustrated with reference to an example embodiment of the invention, described with reference to the appended drawings listed as follows.

DETAILED DESCRIPTION

Figure 1:
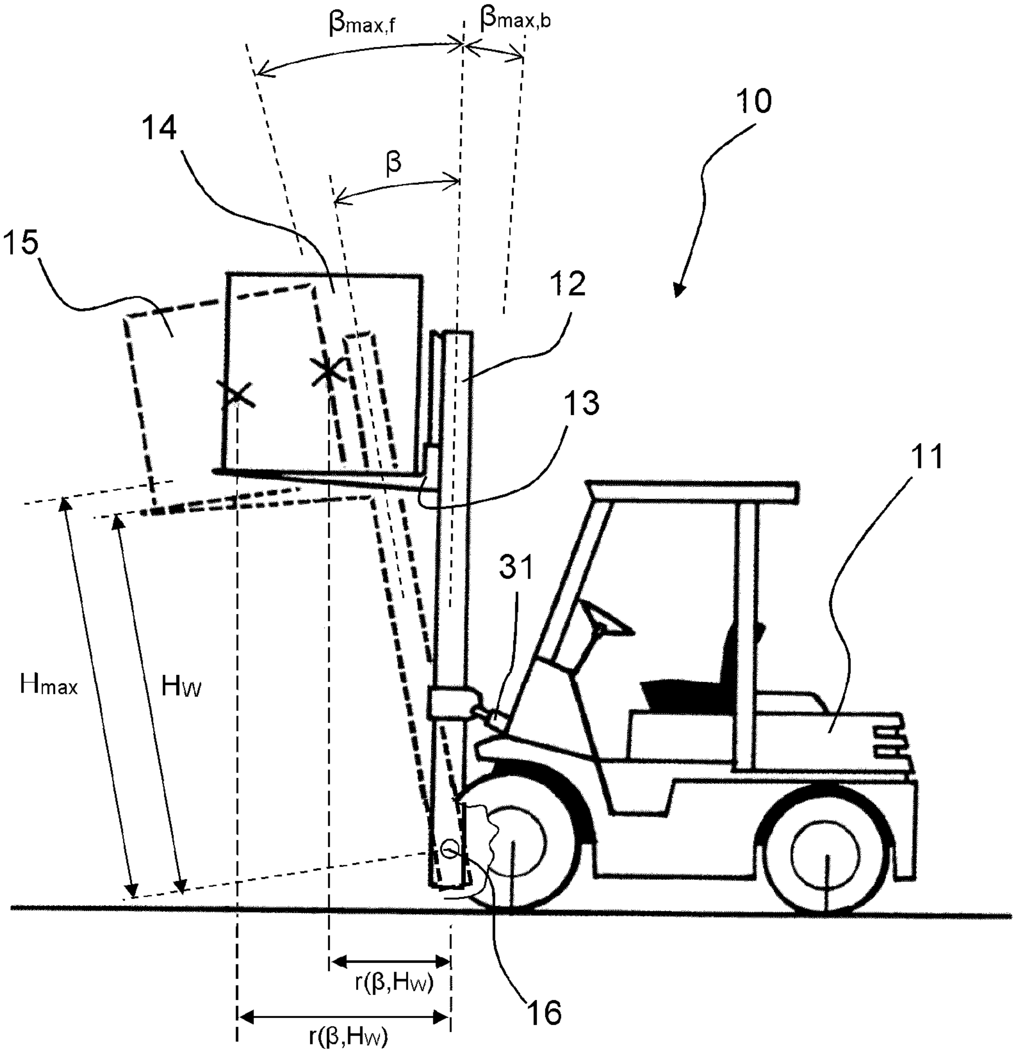
FIG. 1 shows a lateral view of an industrial truck according to the invention.

FIG. 1 shows an industrial truck 10 according to an embodiment of the present invention, e.g., a forklift truck. The industrial truck 10 includes a chassis (or frame) 11, a mast 12 pivotally mounted on the chassis 11 and lifting element 13 (e.g., a fork) for lifting a load 14; the lifting element 13 is mounted on the mast 12 in a slidable manner along the mast 12; in FIG. 1 the lifting element 13 is shown in a lifted position. The mast 12 is pivotally mounted on the chassis 11 around the pivot 16, which is preferably located close to the front axle of the truck 10. The mast 12 may be tilted over a range of directions encompassing a vertical direction. The pivot 16 is substantially parallel to the front axle of the truck 10. In FIG. 1, the load 15 is illustrated in dashed line in case the mast 12 is tilted forward at a tilt angle β. The industrial truck 10 may be electrically driven or may include an endothermic motor. Further, the industrial truck 10 might include four wheels or three wheels disposed on a front axle and a rear axle.

Figure 2:
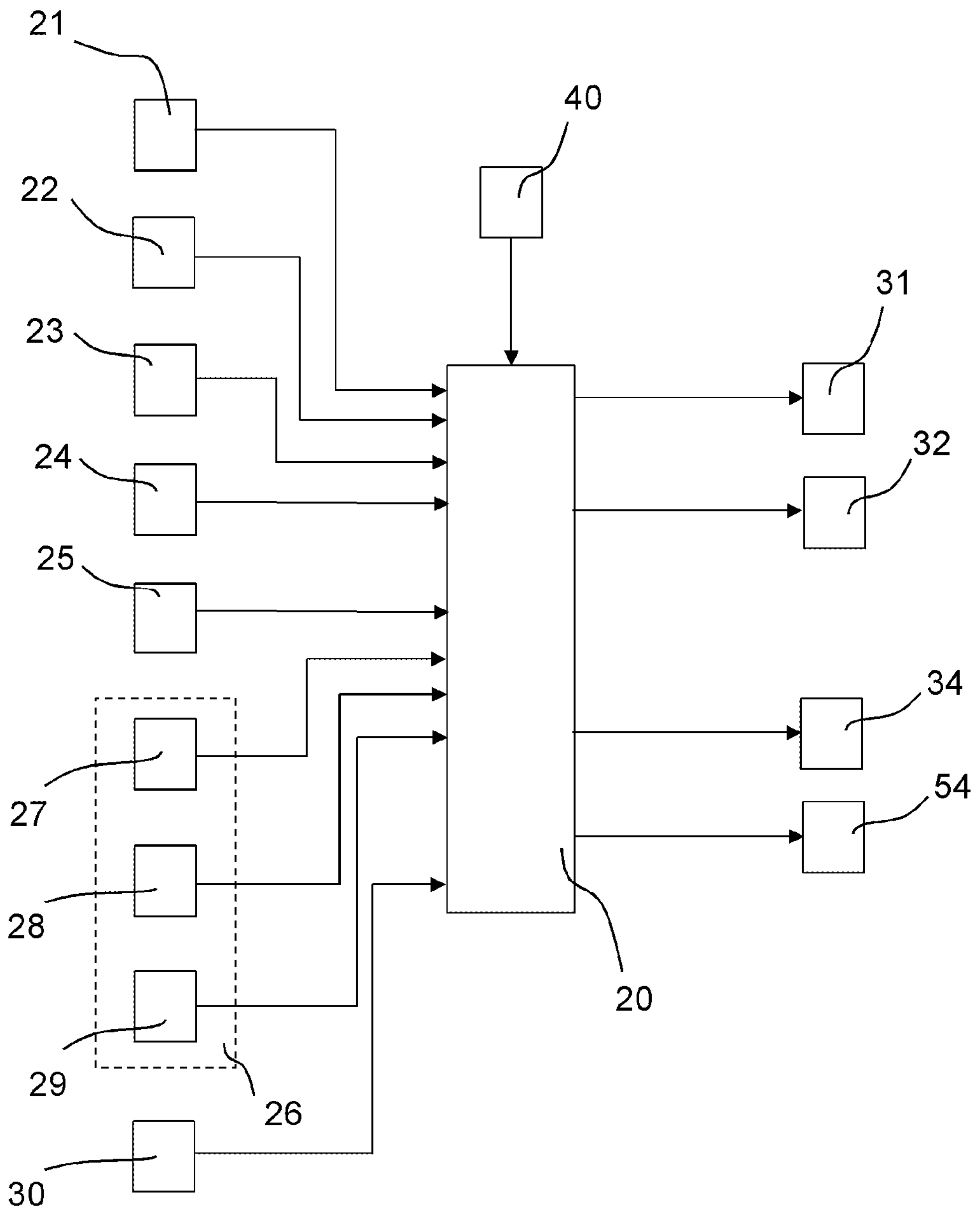
FIG. 2 shows a schematic view of the sensors, the control unit and the actuators of the industrial truck.

The truck 10 includes at least a lifting actuator 32 (shown in FIG. 2) configured to move the lifting element 13 along the mast 12 and a tilting actuator 31 (shown in FIGS. 1 and 2) configured to tilt the mast 12 with respect to the chassis 11. The truck further includes a control unit 20 (shown in FIG. 2) configured to control the lifting actuator 32 and the tilting actuator 31. As shown in FIG. 2, the control unit 20 controls also further actuators of the truck, i.e., a wheel drive system 34. The wheel drive system 34 can be implemented according to any know art. In particular, the wheel drive system 34 may include one or more motors for driving the wheels of the truck and a braking system. In addition, the control unit 20 may be preferably configured to output a warning signal and/or an indication of a control value (such as an allowed operational range of the truck identified by a maximum allowed lifting height, a maximum allowed forward tilt angle and the like) to an output interface 54 including, e.g., a speaker and/or a display.

The industrial truck 10 further includes a number of sensors for controlling the operation of the truck and, in particular, its stability at standstill. The sensors of the truck 10 includes at least:

a load sensor 21 (FIG. 2) for detecting the load value W (i.e., the weight of the load 14) on the lifting element 13 and to output to the control unit 20 load information indicating the detected load, a tilt angle sensor 22 (FIG. 2) for detecting the tilt angle β (shown in FIG. 1) of the mast 12 with respect to the chassis 11 and to output to the control unit 20 tilt angle information indicating the detected tilt angle, a height sensor 23 (FIG. 2) for detecting the height $H_W$ (shown in FIG. 1) of the lifting element 13 with respect to the mast 12 and to output to the control unit 20 height information indicating the detected height of the lifting element 13.

According to the invention, the truck 10 further includes a rear axle sensor 30 for detecting the load on a rear axle of the industrial truck 10. For example, the rear axle sensor 30 may be realized with a load cell mounted on the rear axle.

Preferably, the industrial truck 10 further includes an inclination sensor 27 (shown in FIG. 2) configured to detect an inclination a (see FIG. 4) of the industrial truck with respect to a horizontal plane and to output inclination information indicating the detected inclination to the control unit 20.

Preferably, the industrial truck 10 further includes a speed sensor 24 for detecting the speed of the truck, a steering angle sensor 25 to detect the steering angle of the truck, a longitudinal acceleration sensor 28 for detecting the longitudinal acceleration of the truck and a lateral acceleration sensor 29 for detecting the lateral acceleration of the truck (FIG. 2). In the context of the present application, the term “longitudinal” refers to a direction from the rear axle to the front axle of the truck 10, while the term “lateral” refers to a direction transversal to the longitudinal direction of the truck. Advantageously, the inclination sensor 27, the longitudinal acceleration sensor 28 and the lateral acceleration sensor 29 are formed by a single Inertial Measurement Unit, IMU, 26. This allows to reduce the number of the sensors installed in the truck by using a single known sensor available on the market. Preferably, the IMU 26 is mounted on a lower part of the chassis 11.

All sensors 21-30 output sensed information to the control unit 20, either continuously or at intervals.

Preferably, the control unit 20 may be configured:

to control the lifting actuator 32 by limiting the lifting height of the lifting element below a maximum allowed lifting height $H_{max}$ of the lifting element based on the inclination information, the load information and the tilt angle information, and to control the tilting actuator 31 by limiting the tilt angle β below a maximum allowed forward tilt angle $\beta_{max,f}$ of the mast based on the inclination information, the load information and the height information.

By controlling the lifting operation and mast tilting operation based on the truck inclination, it is possible to achieve a safe and reliable stability control under a wide range of conditions, also taking into account possible inclined slopes (such as a ramp or the like). Furthermore, the stability control involves a limited number of sensors at standstill, notably the inclination sensor 27, the load sensor 23 and the sensors 21-22 for controlling lifting height and mast tilt angle; thus, it is possible to achieve a highly reliable operation at standstill by minimizing the potential impact of component failures. Accordingly, the stability control is achieved in a simple and efficient manner at standstill, by considering a limited number of relevant variables of the loaded truck.

As shown in FIG. 2, the control unit 20 receives a command inputted by the user via a user interface 40, such as controlling console. The command inputted by the user may include a command to lift/lower the lifting element 13, a command to tilt the mast 12 backward or forwards, a command to accelerate/brake the truck 10 and a command for steering the wheels of the truck 10.

According to a preferred embodiment, the control unit 20 limits the lifting height $H_W$ of the lifting element 13 below a maximum allowed lifting height $H_{max}$ for avoiding a condition in which the truck may lose stability. For example, the control unit 20 might interrupt the lifting operation currently commanded by the user by means of the user interface 40 in case the lifting height of the lifting element 13 approaches the maximum allowed lifting height $H_{max}$. The maximum allowed lifting height $H_{max}$ may be lower than the maximum lifting height which is rendered possible by the mechanical configuration of the truck.

Similarly, according to a preferred embodiment, the control unit 20 limits the tilt angle of the mast 12 below a maximum allowed forward tilt angle $\beta_{max,f}$ for avoiding a condition in which the truck may lose stability. For example, the control unit 20 might interrupt the tilting operation currently commanded by the user by means of the user interface 40 in case the tilt angle approaches the maximum allowed forward tilt angle $\beta_{max,f}$. The maximum allowed forward tilt angle $\beta_{max,f}$ may be lower than the maximum forward tilt angle which is rendered possible by the mechanical configuration of the truck.

Preferably, the control unit is configured to control the tilting actuator 31 by limiting the tilt angle β between the maximum allowed forward tilt angle $\beta_{max,f}$ of the mast 12 and a maximum allowed backward tilt angle $\beta_{max,b}$ (see FIG. 1) of the mast calculated based on the inclination information, the load information and the height information. In fact, in case the truck is on a steep slope, the inclination a might increase the risk of tipping backward around the rear axle of the truck 10, in case a heavy load is in a lifted position. The control unit 20 controls the tilt angle so as to avoid that the mast 12 is tilted backward to a position which may cause the tipping of the truck backwards. This additional control of the maximum allowed backward tilt angle enhances the safety of the truck at standstill under any condition, considering also the case of steep slopes.

Preferably, the control unit 20 is further configured to control the lifting actuator by limiting the maximum allowed lifting height $H_{max}$ of the lifting element 13 to a value calculated based on the inclination information, the load information and the tilt angle information. For example, the control unit might use a mathematical model of the truck to calculate the maximum allowed height of the lifting element in static condition, based on the inclination information, the load information and the tilt angle information. This allows to efficiently, rapidly and safely calculate the maximum height of the lifting element by using a simple model and a limited number of signals from a limited number of sensors (i.e., the inclination sensor, the load sensor and the tilt angle sensor). Accordingly, a reliable and efficient algorithm for achieving truck stability at standstill is obtained.

The control unit 20 may be configured to generate one or more control values by using a mathematical model of the industrial truck to which the load information, the height information and the tilt angle information are inputted, the control unit being configured to control the lifting actuator and/or the tilting actuator based on the one or more control values. An example of a mathematical model used for generating control values is described later.

Preferably, the one or more control values includes one or more of the following:

the maximum allowed lifting height $H_{max}$,
the maximum allowed forward tilt angle $\beta_{max,f}$,
the maximum allowed backward allowed tilt angle βmax, b, and/or
an indication that a lifting operation or a tilting operation commanded by the user is bringing the industrial truck close to an unstable condition. Most preferably, the control values generated by the control unit 20 include all of the above mentioned control values for improving stability control. The control values may be displayed by the output interface 54 during operation or an acoustic warning may be emitted by the output interface 54 to the user.

In an embodiment, the control unit 20 may stop a lifting operation and/or a tilting operation commanded by a user when a control value generated by the control unit 20 indicates that the industrial truck 10 is close to a condition in which the industrial truck tips backwards around the rear axle. Alternatively, the control unit 20 may stop a lifting operation commanded by a user when the detected height of the lifting element 13 approaches the maximum allowed lifting height. Alternatively, the control unit 20 may to stop a tilting operation when the tilt angle detected by the tilt angle sensor approaches one of the maximum allowed forward tilt angle $\beta_{max,f}$ or the maximum allowed backward allowed tilt angle $\beta_{max,b}$. The above control values allow to achieve a satisfactory control of the truck to ensure stability in case of static conditions, i.e., in case the truck is not translating and the wheels are not driven to rotate (at standstill).

According to a preferred embodiment, the control unit 20 may be further configured to generate one or more control values by inputting to the mathematical model of the industrial truck a wheels speed, a longitudinal acceleration, a lateral acceleration and steering angle information detected by respective sensors 24, 25, 28 and 29 of the industrial truck. In this case, the control unit 20 is configured to control the truck speed, the truck acceleration and the truck braking based on the one or more control values. This allows to control the dynamic behavior of the truck to avoid the risk of tipping and losing stability of the truck due, e.g., to abrupt steering or excessive braking commanded by the user.

Preferably, these additional one or more control values includes one or more of the following:

the maximum allowed forward speed,
the maximum allowed backward speed,
the maximum allowed forward acceleration,
the maximum allowed backward acceleration,
the maximum forward/backward braking deceleration.

Most preferably, the control values include all of the above mentioned control values. Also these additional control values may be displayed by the output interface 54 to the user.

The control unit 20 may be configured to calculate the maximum allowed lifting height $H_{max}$ and the maximum allowed forward tilt angle $\beta_{max,f}$ continuously and repeatedly during operation of the industrial truck. Likewise, the control unit 20 may calculate the maximum allowed backward tilt angle $\beta_{max,b}$ continuously and repeatedly.

When the industrial truck's wheels are in stationary condition (i.e., when the truck is not translating), the control unit 20 may be configured to control the lifting actuator and the tilting actuator based only on the following inputs: the load information, the tilt information, the height information, the inclination information and a command inputted by a user by means of a user interface 40.

Figure 3:
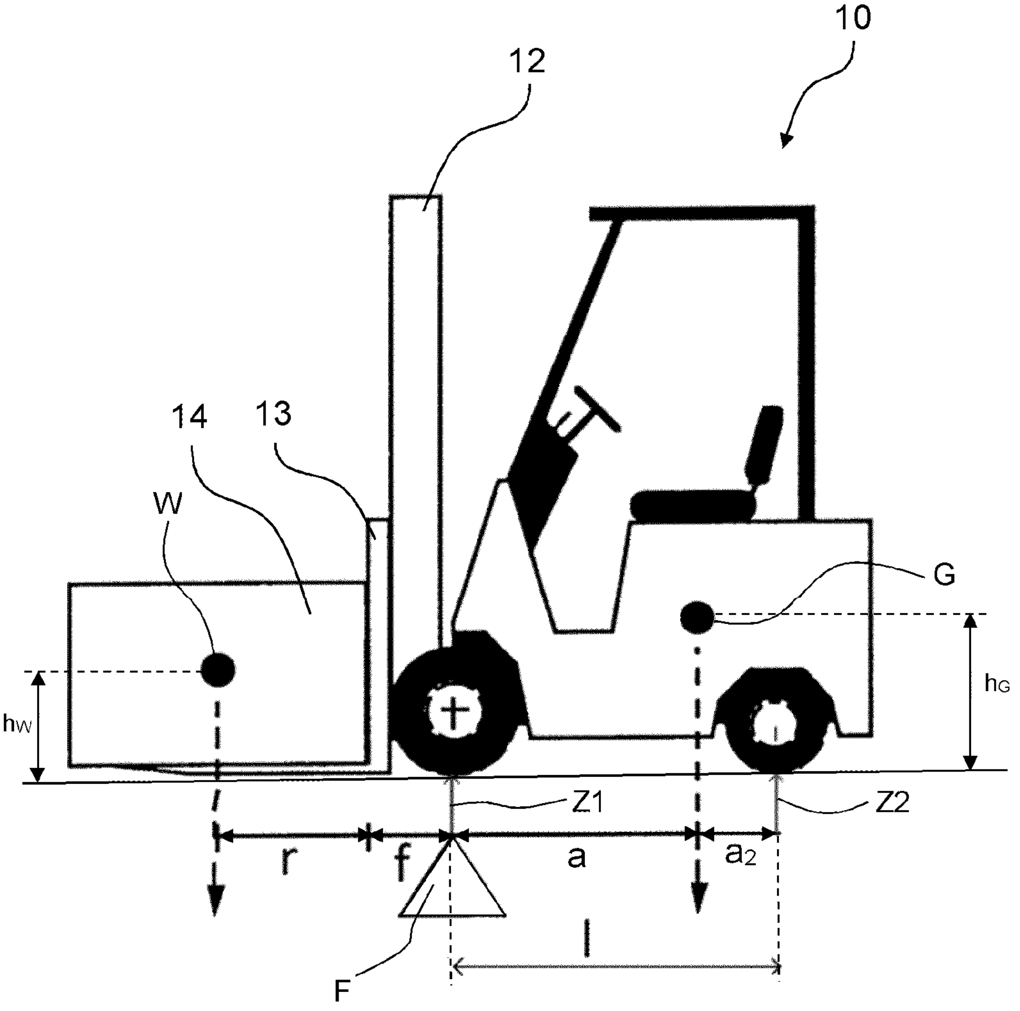
FIG. 3 shows the truck on a horizontal surface.

Preferably, the control unit 20 is configured to estimate the longitudinal position of the load 14 on the lifting element based on the load detected by the load sensor 21 for detecting the load on the lifting element 13 and the load detected by the rear axle sensor 30. Furthermore, the control unit 30 may be advantageously configured to generate the one or more control values by inputting the estimated longitudinal position of the load to the mathematical model. The longitudinal position of the load 14 on the lifting element 13 may be calculated as follows with reference to FIG. 3.

The following equations describe the forces on the front axle and rear axle of the truck as a function of the load weight W on the lifting element 13 and the weight G of the truck 10.

$$Z_1 = G\frac{a_2}{l} + W\frac{l+r+f}{l} \quad \text{Formula (1)}$$

$$Z_2 = G\frac{a}{l} - W\frac{r+f}{l} \quad \text{Formula (2)}$$

where G is the weight of the truck 10, W is the weight of the load 14, a is the longitudinal distance between the center of gravity of the truck 10 and the front axle (corresponding to the fulcrum F in FIG. 3), $a_2$ is the longitudinal distance between the center of gravity of the truck 10 and the rear axle of the truck 10, l is the distance between front and rear axles of the truck, $Z_1$ is the force on the front axle of the truck and Z2 is the force on the rear axle of the truck, f is the longitudinal distance between the front axle of the truck (fulcrum F in FIG. 3) and the bearing surface of the lifting element 13 and r is the longitudinal distance of the center of gravity of the load 14 from the vertical element lifting element 13. r+f represents the distance of the center of gravity of the load 14 from the front axle of the truck.

At standstill, the following formula gives the maximum allowed load weight on the lifting element to maintain stability and avoiding forward tipping over:

$$W_{max} = \frac{aG}{r+f} \quad \text{Formula (3)}$$

Using formula (2), the control unit 20 can calculate the longitudinal position of the load (r+f) on the lifting element 13 using the measure $Z_2$ of the load on the rear axle as detected by the rear axle load sensor 30 and the weight W detected by the load sensor 21 (l, G and a are constant parameters characteristic of the truck):

$$r + f = \frac{Ga - lZ_2}{W} \quad \text{Formula (4)}$$

In fact, the value of r can vary depending on the weight distribution of the load 14 and, also, on how the user lifts the load 14 with the lifting element 13. By calculating the value of r according to Formula (4), the control unit 20 can input a refined value of the position of the load 14 in the mathematical model of the truck, thereby improving the accuracy of the control values produced by using the model itself. This allows to improve the stability control and the performance of the truck, by appropriately estimating, e.g., the maximum allowable height of the load and the maximum forward/backward tilt angles. The refined mathematical model also allows to improve the stability control in dynamic conditions, for example by properly controlling the maximum speed or the maximum allowed steering angle. Preferably, the control unit 20 calculates an estimated longitudinal position of the load on the lifting element 13 every time when a load is lifted by the lifting element 13, i.e., when the load sensed by the load sensor 21 increases from zero to a value different from zero above a threshold.

The position limit of the center of gravity of the load 14 corresponds to the length of the fork 13, $L_{forks}$, in the longitudinal direction. This value is preferably used to control the proper operation of the rear axle load sensor 30 by means of the following condition by the control unit 20:

$$(r+f)_{load\ cell} > (L_{forks}+f) \qquad \text{Formula (5)}$$

where $(r+f)_{load\ cell}$ defines the value of r+f estimated based on the measure from the rear axle load sensor 30 by the control unit using the mathematical model. If the above condition as defined by formula (5) is verified an error occurs due to data received from the rear axle load sensor not being reliable. In this case a warning signal is emitted to the user indicating the error in the operation of the rear axle load sensor 30. This permits to achieve a self-monitoring function of the control system, as the proper functioning of the rear axle sensor is monitored.

Figure 4:
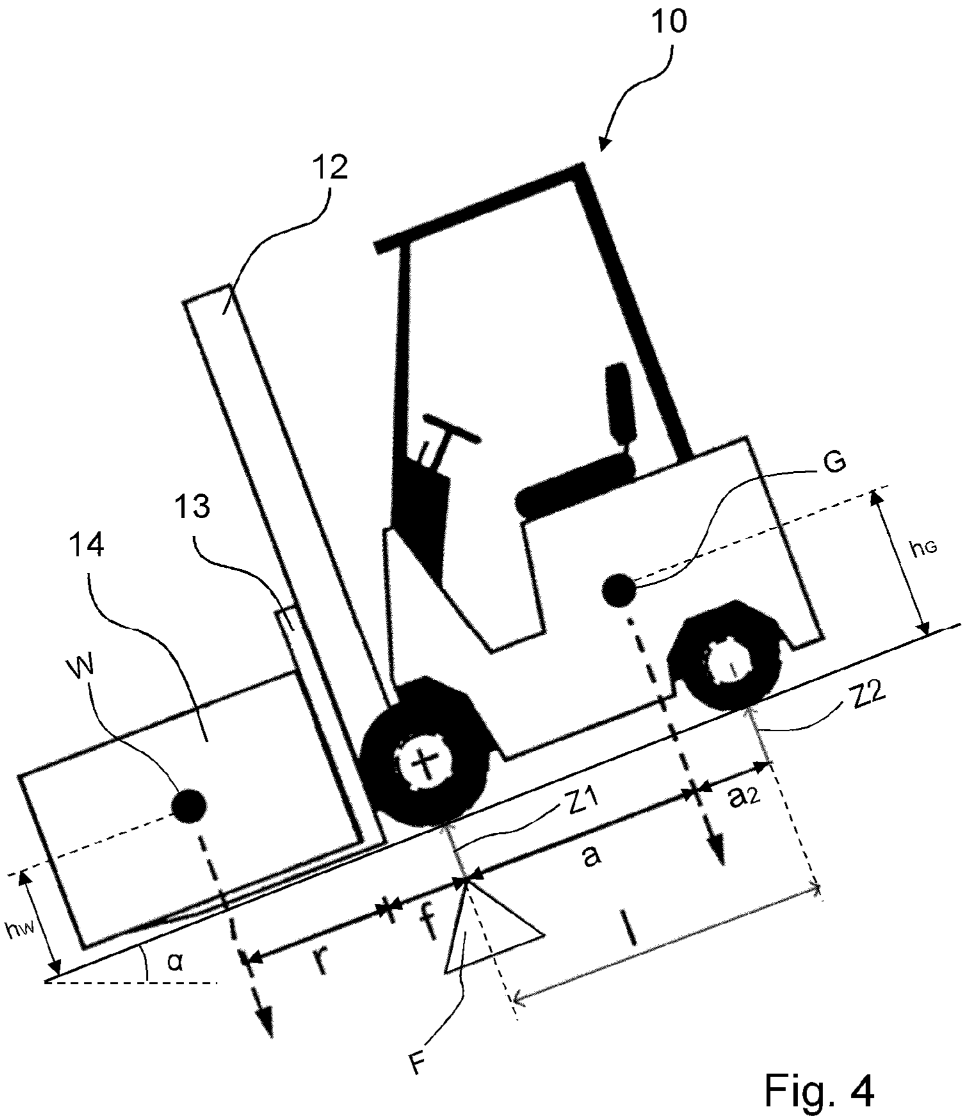
FIG. 4 shows the truck on an inclined surface.

FIG. 4 shows the truck on an inclined surface, i.e., a non-horizontal surface. When the truck is inclined at an angle α as shown in FIG. 4, the maximum weight $W_{max}$ which can be carried on the lifting element 13 without losing stability due to forward tipping is expressed by the following equation, which represents an example of a mathematical model used by the control unit 20 for determining an unstable condition and/or control values as above discussed:

$$W_{max} = \frac{G[a - h_G(\tan\alpha)]}{[h_W(\tan\alpha) + (r+f)]} \qquad \text{Formula (6)}$$

wherein $h_G$ is the height of the center of gravity of the truck 10 (a constant parameter of the truck 10) and $h_W$ is the height of the center of gravity of the load 14.

In formula (6), r is a function $r(\beta, H_W)$ of the lifting height $H_W$ and of the mast tilt angle β shown in FIG. 1. Similarly, also the height of the load $h_W$ can be expressed as a function $h_W(\beta, H_W)$ of the lifting height $H_W$ and of the mast tilt angle β.

When the detected load weight W on the lifting element 13 approaches the maximum load $W_{max}$ according to the following formula $$W_{max} - W < \Delta W_{safety} \qquad \text{Formula (7)}$$

the control unit 20 emits a warning (e.g., acoustic and visual signaling on the display) to the operator and blocks the function commanded by the user (e.g., forward tilting and/or lifting).

On the display 54 of the truck, the maximum height and the maximum forward tilting are shown, so the operator can easily be aware about a safety area of operation. Preferably, also the maximum backward tilt angle can be shown in the display 54 to the user.

Figure 5:
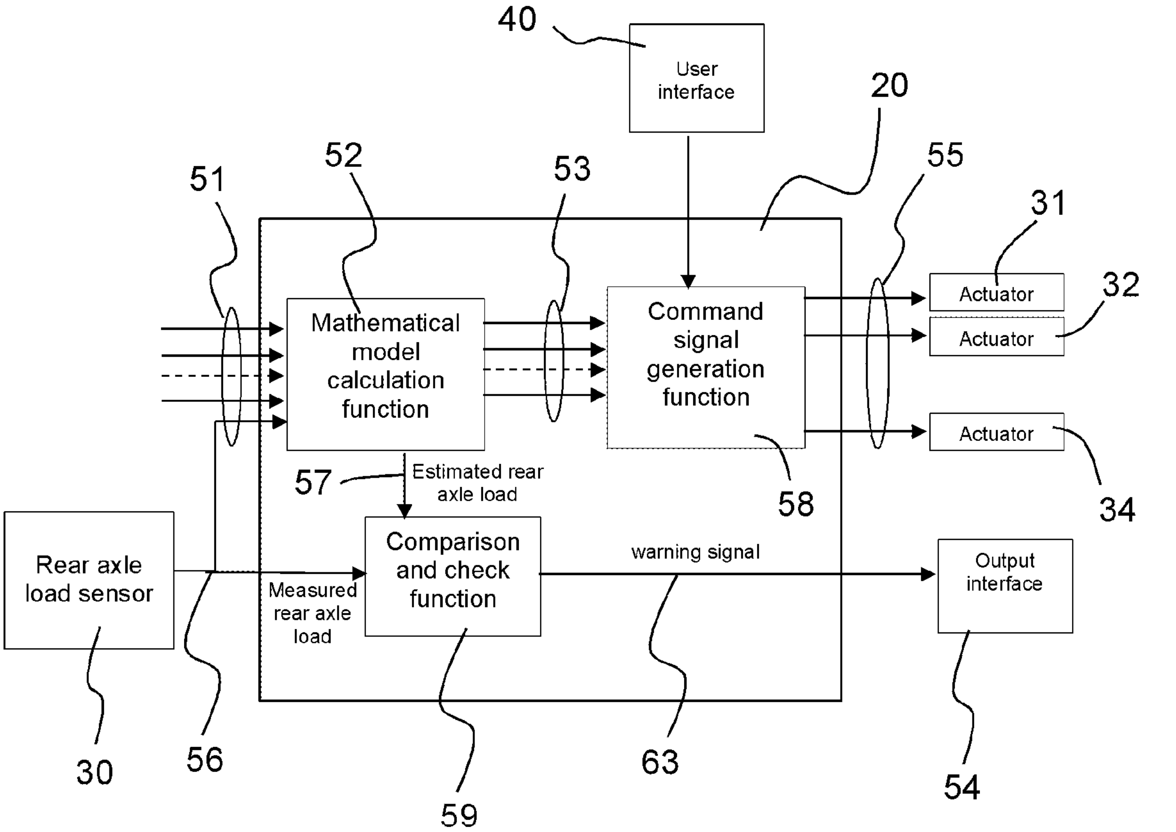
FIG. 5 is a schematic view of the logic functions performed by the control unit of the truck according to the invention.

FIG. 5 shows a schematic view of logic functions carried out by the control unit 20, in particular for performing a control function check procedure. According to a preferred embodiment of the invention, in fact, the measure of the rear axle load sensor 30 is used to verify the correct operation of the stability control function of the truck.

The control function check procedure comprises:

- calculating an estimated value of the load on the rear axle by using the mathematical model,
- comparing the estimated value with the rear axle load value detected by the rear axle load sensor 30, and
- generating an alarm signal when the difference between the estimated value and the detected rear axle load value exceeds a predetermined threshold.

The control function check procedure allows to monitor the correct operation of the stability control of the truck, in particular of the control unit 20 operating the control on the basis of the above described mathematical model. This allows to improve reliability of the truck's operation. Advantageously, when generating an alarm signal, the control unit 20 might also stop the operation of the truck for safety reasons.

In FIG. 5 the input signals 51 includes signals representing the values measured by the sensors of the truck, i.e., one or more of the sensors 21-30. The input signals 51 are inputted to a mathematical model calculation function 52 of the control unit 20 for calculating control values 53 using a mathematical model of the truck 10. The function 52 outputs control values 53 to be used for controlling the operation of the truck by guaranteeing stability. The control values 53 are outputted to a command signal generation function 58 which generates command signals 55 based on the control values 53 and based on an input from the user interface 40. The command signals 55 are outputted to the actuators for operating the industrial truck 10. In addition, the mathematical model calculation function 52 calculates an estimated rear axle load value 57 which is outputted to a comparison and check function 59. The comparison and check function 59 compares the estimated rear axle load value 57 (i.e., the estimated value of the load on the rear axle) with the measured rear axle load value 56 received from the rear axle load sensor 30. In case the difference between the estimated value and the measured value exceeds a predetermined threshold, the comparison and check function 59 emits a warning signal 63 to the output interface 54, such as a speaker and/or a display. The warning signal warns the user that the stability control may not be properly functioning. Based on the warning signal, the control unit 20 might also stop the operation of the truck for safety reasons.

Further, the control unit 20 may be configured to initiate the control function check procedure when the following two conditions are simultaneously verified:

- the control unit 20 determines that the mast 12 is not moving based on signals from the tilt angle sensor 22 and the height sensor 23 and
- the speed sensor 24 detects that the truck is not moving.

With "the mast is not moving" it is here intended that the mast is not being tilted by means of the tilting actuator 31 and the lifting element is not lifted/lowered by means of the lifting actuator 32. With "the truck is not moving" it is here intended that the traction of the truck is not active, i.e., that the truck frame is not translating. Since the truck is not moving (static condition of loaded truck), the control function check procedure does not produce false alarms due to possible abnormal values sensed by the sensors of the truck, e.g., when the truck is being driven into a bump and/or hole. In fact, in the case of a loaded truck in dynamic condition, it is difficult to filter the influence, e.g., of bumps/holes during the stability control. Also, false alarms due to dynamic effects on the sensed loads in the case of a moving mast are avoided. Preferably, the control unit 20 starts the control function check procedure periodically, e.g., every 5 seconds, while the above two conditions are verified. This behavior allows to verify the correct functioning of the mathematical model and, thereby, of the stability control in case of standstill. By repeatedly performing the control function check procedure the mathematical model can be tested under many different situations during operation (lifting, tilting backward or forward, lifting in case the truck is inclined and so on), so that the proper functioning of all sensors can be reliably verified. Thus, reliability of the stability control is further improved.

Further, the control unit 20 is configured not to initiate a control function check procedure or to dismiss an ongoing control function check procedure when at least one of the following two conditions are verified:

- the control unit 20 determines that the mast 12 is moving based on signals from the tilt angle sensor 22 and the height sensor 23, and
- the sensor speed detects that the industrial truck is moving.

This permits to avoid false alarms as no control function check procedure is performed while the truck is driven or the mast is being moved. Thus, reliability is further improved.

Figure 6:
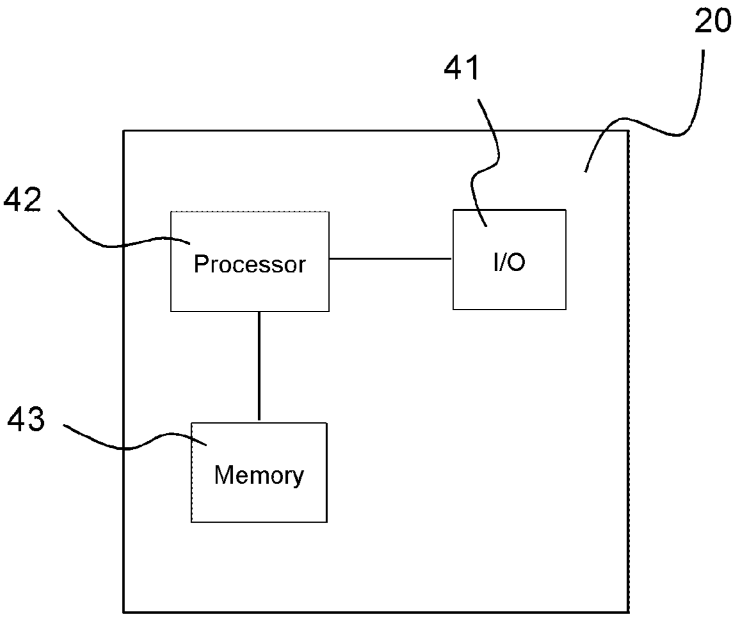
FIG. 6 shows a schematic view of an implementation of the control unit of the industrial truck.

FIG. 6 shows a possible implementation of the control unit 20. In an embodiment, the control unit 20 includes a processor 42, a memory 43 and a I/O interface 41. The processor is configured to execute a control software stored on the memory 43 to execute any of the functions of the control unit 20 as above described. When executing the control software, the processor 42 receives as input the information from the sensors 21-30 by means of the I/O interface 41 and outputs control signals to the actuators 31-34 using the I/O interface 41 as well. Also other possible implementations of the control unit can be conceived, e.g., including a plurality of distributed processors or the like.

The above description of embodiments applying the innovative principles of the invention is provided solely for the purpose of illustrating said principles and must thus not be considered as limiting the scope of the invention claimed herein.

Additional features can be added using data from the sensors to avoid misuses and increase the comfort of the operator.

For example, according to an additional optional feature, the truck 10 may have an auto forks positioning function. During travelling it should be mandatory to have forks in a low position with maximum backward tilt angle. According to the auto forks positioning function, the operator of the truck can request (by pushing a button, e.g., of the user interface 40) to bring the load in the "travelling position" automatically, i.e., with low position of the lifting element 13 and maximum backward tilt angle of the mast 12. The control unit 20 acts accordingly on the lifting and tilting actuators 32, 31 when receiving the corresponding command by the user.

According to a further optional feature, the truck 10 may have a fork hitting avoidance function. Here, the height sensor can be used to avoid hit when the forks 13 reach the end of the stroke or to ground during its movement along the mast 12. Thus, when the lifting element 13 is approaching the end of stroke along the mast 12, the control unit 20 controls the lifting actuator so as to decrease the speed of lifting or lowering the lifting element. This allows to reduce the risk of vibrations of the lifting element, which may bring the truck 10 in an unstable situation.

According to a further optional feature, moreover, the mast 12 may include plural stages, each stage corresponding to a segment of the mast along which the movement of the fork is caused by a stage actuator, e.g., a cylinder. Each end of a stage segment may cause a hitting of the fork when the additional adjacent stage starts/stops to move. Preferably, the control unit 20 has stored information concerning the height of the end of stroke points and the height of the change of stage. By using this stored information, the control unit 20 can control the lifting actuator so as to:

- Stop lift at the end of the maximum mast stroke (i.e. maximum possible height of the lifting element 13 along the mast 12) or decrease the lifting speed when approaching this position of the lifting element;
- Stop lower function when the fork reaches the ground (i.e. the lowest possible position of the lifting element 13 along the mast 12);
- Reduce speed of the lowering and lifting movement when the fork's height is close to the stage change along the mast 12.

Preferably, the truck may include a further auto-positioning function at truck start. In fact, after loading, often the operator forgets to lift a little bit the forks to avoid their scrape on the ground. As soon the operator starts to move, the control unit 20 checks the position of the fork 13. If the fork 13 is on the ground, the control unit 20 automatically controls the relevant actuators to lift and tilt backward the mast to avoid forks scraping.

The invention claimed is:

1. An industrial truck, including:

a chassis;

a mast pivotally mounted on the chassis;

a lifting element for lifting a load, the lifting element being mounted on the mast in a slidable manner along the mast;

a plurality of actuating units including:

a lifting actuator configured to move the lifting element along the mast;

a tilting actuator configured to tilt the mast with respect to the chassis; and a wheel drive system for driving wheels of the industrial truck;

a plurality of sensors including:

a load sensor for detecting the load on the lifting element;

a tilt angle sensor for detecting the tilt angle of the mast with respect to the chassis; and a height sensor for detecting the height of the lifting element with respect to the mast;

a control unit configured to control the plurality of actuating units based on information detected by the plurality of sensors for achieving stability of the industrial truck during operation, wherein the control unit is configured to generate one or more control values by using a mathematical model of the industrial truck to which information detected by the plurality of sensors are inputted, the control unit being configured to control the plurality of actuating units based on the one or more control values; and a rear axle load sensor configured to detect the load on a rear axle of the industrial truck, wherein the control unit is configured to control the operation of the industrial truck also based on a rear axle load value detected by the rear axle load sensor, wherein the control unit is configured to perform a control function check procedure, the control function check procedure comprising:

calculating an estimated value of the load on the rear axle by using the mathematical model;

comparing the estimated value with the rear axle load value detected by the rear axle load sensor; and generating an alarm signal when the difference between the estimated value and the detected rear axle load value exceeds a predetermined threshold.

2. The industrial truck according to claim 1, wherein the control unit is configured to initiate the control function check procedure when the following two conditions are simultaneously verified:

the control unit determines that the mast is not moving based on signals from the tilt angle sensor and the height sensor; and a speed sensor of the industrial truck detects that the truck is not moving.

3. The industrial truck according to claim 1, wherein the control unit is configured not to initiate a control function check procedure or to dismiss an ongoing control function check procedure when at least one of the following two conditions are verified:

the control unit determines that the mast is moving based on signals from the tilt angle sensor and the height sensor; and a speed sensor of the industrial truck detects that the industrial truck is moving.

4. The industrial truck according to claim 1, wherein the control unit is configured to estimate a longitudinal position of the load on the lifting element based on the load value detected by the load sensor for detecting the load on the lifting element and the rear axle load value detected by the rear axle sensor.

5. The industrial truck according to claim 4, wherein the control unit is configured to generate the one or more control values by inputting the estimated longitudinal position of the load to the mathematical model.

6. The industrial truck according to claim 4, wherein the control unit is configured to generate an alarm signal when the estimated longitudinal position indicates a position of the load that is not on the lifting element.

7. The industrial truck according to claim 4, wherein the control unit is configured to estimate the longitudinal position of the load on the lifting element when the load value detected by the load sensor increases from zero to a positive value.

8. The industrial truck according to claim 1, wherein the plurality of sensors further includes a truck speed sensor, a truck steering angle sensor, a lateral acceleration sensor and a longitudinal acceleration sensor.

9. The industrial truck according to claim 1, wherein the plurality of sensors further includes an inclination sensor configured to detect an inclination of the industrial truck with respect to a horizontal plane.

10. An industrial truck, including:

a chassis;

a mast pivotally mounted on the chassis;

a lifting element for lifting a load, the lifting element being mounted on the mast in a slidable manner along the mast;

a plurality of actuating units including:

a lifting actuator configured to move the lifting element along the mast;

a tilting actuator configured to tilt the mast with respect to the chassis; and a wheel drive system for driving wheels of the industrial truck;

a plurality of sensors including:

a load sensor for detecting the load on the lifting element;

a tilt angle sensor for detecting the tilt angle of the mast with respect to the chassis; and a height sensor for detecting the height of the lifting element with respect to the mast;

a control unit configured to control the plurality of actuating units based on information detected by the plurality of sensors for achieving stability of the industrial truck during operation, wherein the control unit is configured to generate one or more control values by using a mathematical model of the industrial truck to which information detected by the plurality of sensors are inputted, the control unit being configured to control the plurality of actuating units based on the one or more control values; and a rear axle load sensor configured to detect the load on a rear axle of the industrial truck, wherein the control unit is configured to control the operation of the industrial truck also based on a rear axle load value detected by the rear axle load sensor, wherein the control unit is configured to estimate a longitudinal position of the load on the lifting element based on the load value detected by the load sensor for detecting the load on the lifting element and the rear axle load value detected by the rear axle sensor, and wherein the control unit is configured to generate an alarm signal when the estimated longitudinal position indicates a position of the load that is not on the lifting element.

11. An industrial truck, including:

a chassis;

a mast pivotally mounted on the chassis;

a lifting element for lifting a load, the lifting element being mounted on the mast in a slidable manner along the mast;

a plurality of actuating units including:

a lifting actuator configured to move the lifting element along the mast;

a tilting actuator configured to tilt the mast with respect to the chassis; and a wheel drive system for driving wheels of the industrial truck;

a plurality of sensors including:

a load sensor for detecting the load on the lifting element;

a tilt angle sensor for detecting the tilt angle of the mast with respect to the chassis; and a height sensor for detecting the height of the lifting element with respect to the mast;

a control unit configured to control the plurality of actuating units based on information detected by the plurality of sensors for achieving stability of the industrial truck during operation, wherein the control unit is configured to generate one or more control values by using a mathematical model of the industrial truck to which information detected by the plurality of sensors are inputted, the control unit being configured to control the plurality of actuating units based on the one or more control values; and a rear axle load sensor configured to detect the load on a rear axle of the industrial truck, wherein the control unit is configured to control the operation of the industrial truck also based on a rear axle load value detected by the rear axle load sensor, wherein the control unit is configured not to initiate a control function check procedure or to dismiss an ongoing control function check procedure when at least one of the following two conditions are verified:

the control unit determines that the mast is moving based on signals from the tilt angle sensor and the height sensor; and a speed sensor of the industrial truck detects that the industrial truck is moving.

* * * * *